United States Patent
Shimoharada

(10) Patent No.: US 8,411,870 B2
(45) Date of Patent: Apr. 2, 2013

(54) ELECTRONIC APPARATUS

(75) Inventor: Junko Shimoharada, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 252 days.

(21) Appl. No.: 13/016,909

(22) Filed: Jan. 28, 2011

(65) Prior Publication Data

US 2011/0188675 A1   Aug. 4, 2011

(30) Foreign Application Priority Data

Jan. 29, 2010   (JP) ................. 2010-019222

(51) Int. Cl.
*H03G 11/00*   (2006.01)
*H04R 29/00*   (2006.01)

(52) U.S. Cl. ............ 381/55; 381/58; 381/120; 381/123; 713/324; 713/340

(58) Field of Classification Search ............ 381/55, 381/58, 59, 96, 118, 120, 123, 384; 330/297, 330/199; 713/300–340
See application file for complete search history.

(56) References Cited

U.S. PATENT DOCUMENTS

| | | | |
|---|---|---|---|
| 5,311,441 A * | 5/1994 | Tayama et al. ............ 702/63 |
| 6,128,263 A | 10/2000 | Fujii et al. | |
| 6,437,699 B1 * | 8/2002 | Hayakawa ............ 340/636.13 |
| 6,523,125 B1 | 2/2003 | Kohno et al. | |
| 6,629,182 B1 * | 9/2003 | Mizoguchi et al. .......... 710/303 |
| 6,772,024 B2 | 8/2004 | Fujii | |
| 7,409,064 B2 * | 8/2008 | Watanuki ............ 381/74 |
| 7,673,156 B1 | 3/2010 | Nojima | |
| 7,945,796 B2 | 5/2011 | Fijiwara | |
| 8,084,987 B2 * | 12/2011 | Hurtz ............ 320/103 |
| 8,230,243 B2 * | 7/2012 | Fujiwara ............ 713/310 |
| 2001/0022842 A1 | 9/2001 | Fujii | |
| 2005/0086614 A1 | 4/2005 | Cheng et al. | |
| 2008/0303947 A1 | 12/2008 | Ohnishi et al. | |
| 2009/0006874 A1 | 1/2009 | Fujiwara | |
| 2011/0158436 A1 * | 6/2011 | Imamura ............ 381/120 |
| 2011/0158441 A1 * | 6/2011 | Batra ............ 381/311 |

FOREIGN PATENT DOCUMENTS

| | | |
|---|---|---|
| JP | H02-260900 | 10/1990 |
| JP | H07-239737 | 9/1995 |
| JP | H11-086433 | 3/1999 |
| JP | 11-194846 | 7/1999 |

(Continued)

OTHER PUBLICATIONS

Notice of Reasons of Rejection mailed by the Japan Patent Office on Apr. 26, 2011 in corresponding Japanese patent app. No. 2010-019222 in 9 pages.

(Continued)

*Primary Examiner* — Xu Mei

(74) *Attorney, Agent, or Firm* — Knobbe, Martens, Olson and Bear, LLP

(57) ABSTRACT

According to one embodiment, an electronic apparatus includes a speaker, a terminal, an amplifier, a battery, a power supply circuit, and a controller. The terminal is configured to input an audio signal from an external device. The amplifier is configured to amplify the audio signal which is input from the terminal, and to output audio from the speaker. The power supply circuit is configured to supply power from the battery to the amplifier. The controller is configured to control the power supply circuit, based on a residual capacity of the battery and a preset battery level, in order to supply the power to the amplifier when the electronic apparatus is in a non-operative state.

12 Claims, 7 Drawing Sheets

FOREIGN PATENT DOCUMENTS

| | | |
|---|---|---|
| JP | H11-202965 | 7/1999 |
| JP | 2000-039935 | 2/2000 |
| JP | 2000-305672 | 11/2000 |
| JP | 2001-197599 | 7/2001 |
| JP | 2001-216132 | 8/2001 |
| JP | 2002-142161 | 5/2002 |
| JP | 2003-309892 | 10/2003 |
| JP | 2005-128994 | 5/2005 |
| JP | 2006-525598 | 11/2006 |
| JP | 2007-108769 | 4/2007 |
| JP | 2007-166557 | 6/2007 |
| JP | 2007-206896 | 8/2007 |
| JP | 2008-258730 | 10/2008 |
| JP | 2009-009532 | 1/2009 |
| WO | WO 2004/088494 | 10/2004 |

OTHER PUBLICATIONS

Notice of Reasons of Rejection mailed by the Japan Patent Office on Aug. 9, 2011 in corresponding Japanese patent app. No. 2010-019222 in 10 pages.

* cited by examiner

| State of PC | Presence/absence of plug | Residual battery capacity | P-power | A-power (amplifier) | B-power | S-power |
|---|---|---|---|---|---|---|
| S0: PC power-on | — | — | ON | ON | ON | ON |
| S3: PC standby | Without plug insertion | — | OFF | OFF | ON | ON |
| | With plug insertion | ≧L2, (or AC power) | OFF | ON | ON | ON |
| S4: PC hibernation | Without plug insertion | — | OFF | OFF | OFF | ON |
| | With plug insertion | ≧L1, (or AC power) | OFF | ON | OFF | ON |
| S5: PC power-off | Without plug insertion | — | OFF | OFF | OFF | ON |
| | With plug insertion | ≧L1, (or AC power) | OFF | ON | OFF | ON |

FIG. 3

| | System State | Memory | Chipset | Cache | Processor | Others | |
|---|---|---|---|---|---|---|---|
| S0 | Power On | ON | ON | ON | ON | ON | Operative state |
| S3 | Suspend-to-RAM | ON | OFF | OFF | OFF | OFF | Standby, Sleep, or Suspend-to-RAM |
| S4 | Suspend-to-Disk | OFF | OFF | OFF | OFF | OFF | Hibernation or Suspend to disk |
| S5 | Power Off | OFF | OFF | OFF | OFF | OFF | Power-off by software |

FIG. 4

ELECTRONIC APPARATUS

CROSS-REFERENCE TO RELATED APPLICATIONS

This application is based upon and claims the benefit of priority from Japanese Patent Application No. 2010-019222, filed Jan. 29, 2010; the entire contents of which are incorporated herein by reference.

FIELD

Embodiments described herein relate generally to an electronic apparatus having a speaker.

BACKGROUND

Conventionally, there is known an AV apparatus which can execute processes, when insertion/detachment of a plug in/from a terminal for receiving an audio signal from the outside is detected, by using the insertion/detachment of the plug as an effective trigger. For example, an AV apparatus disclosed in Jpn. Pat. Appln. KOKAI Publication No. 2007-108769 includes a processing module which executes a process for viewing/listening; a signal output module which outputs a signal to the processing module; a plurality of first signal input modules including a mobile audio input terminal; a first detection module which detects insertion/detachment of a plug in/from the mobile audio input terminal; and a second control module for controlling a connection between the plural first signal input modules and the signal output module in accordance with a detection result of the first detection module.

In the conventional AV apparatus, for example, when the plug is inserted in the mobile audio terminal, an audio signal, which is input from a mobile audio, can be output as an audio output signal of the AV apparatus. In addition, the AV apparatus can execute, as well as the process of outputting audio from the mobile audio, processes of stopping a process for video signals, turning off the backlight of a liquid crystal display, and turning on backlight.

In addition, in the prior art, there is known a telephone apparatus including a cordless handset with a hands-free function which is controlled in accordance with a residual battery capacity. By the hands-free function, the volume of a voice, which is produced from a speaker during a telephone call, can greatly be amplified by a power amplifier, and the voice with the amplified volume can be produced from the speaker. For example, in a cordless handset disclosed in Jpn. Pat. Appln. KOKAI Publication No. 2008-258730, when it is detected that the residual battery capacity has decreased to below a predetermined value, the operation of the hands-free function is prohibited. Thereby, even if an instruction to execute the hands-free function is transmitted from the base phone to the cordless handset, the hands-free function is not operated and the battery power consumption can be decreased.

In the conventional AV apparatus (e.g. TV apparatus), when the plug is inserted in the mobile audio terminal in a normal operative state in which video and audio can be output, the audio from the mobile audio can be output. However, in a non-operative state in which power is turned off, the audio from the mobile audio cannot be output.

In addition, in the cordless handset of the telephone apparatus, the hands-free function can merely be controlled in accordance with the residual battery capacity at the time of the operative state, and the hands-free function cannot be controlled in accordance with the residual battery capacity in the non-operative state.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 3 is an exemplary view showing powers which are supplied in the respective system states of the personal computer according to the embodiment;

FIG. 4 is an exemplary view showing the presence/absence of supply of power to the respective modules in each of the system states in the embodiment;

DETAILED DESCRIPTION

Various embodiments will be described hereinafter with reference to the accompanying drawings.

In general, according to one embodiment, an electronic apparatus comprises a speaker, a terminal, an amplifier, a battery, a power supply circuit, and a controller. The terminal is configured to input an audio signal from an external device. The amplifier is configured to amplify the audio signal which is input from the terminal, and to output audio from the speaker. The power supply circuit is configured to supply power from the battery to the amplifier. The controller is configured to control the power supply circuit, based on a residual capacity of the battery and a preset battery level, in order to supply the power to the amplifier when the electronic apparatus is in a non-operative state.

An embodiment will now be described with reference to the accompanying drawings.

Figure 1:
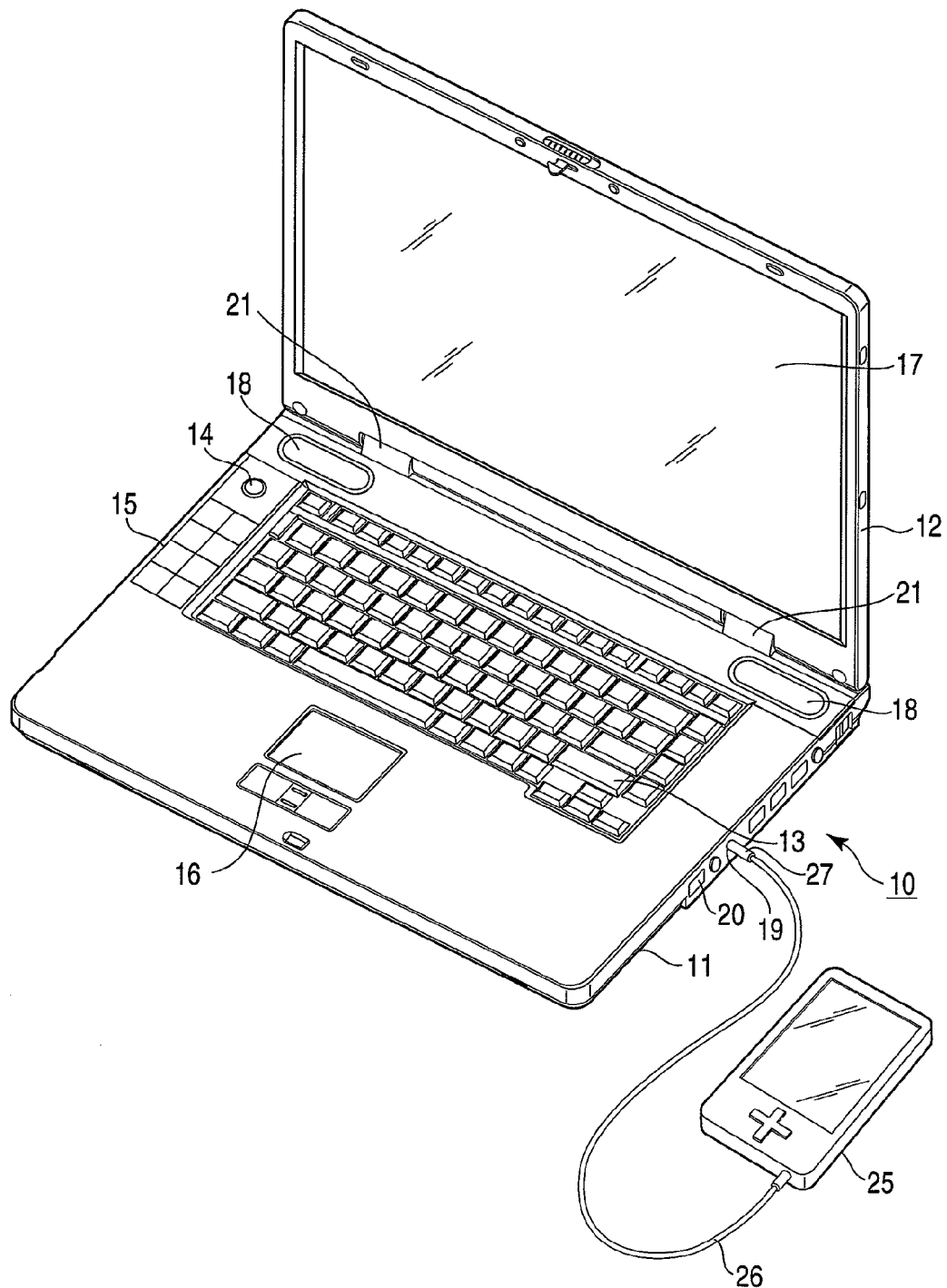
FIG. 1 is an exemplary external appearance view showing the structure of an electric apparatus according to an embodiment.

FIG. 1 is an external appearance view showing the structure of an electronic apparatus according to the embodiment. The electronic apparatus is realized, for example, as a notebook-type portable personal computer 10. The personal computer 10 in this embodiment has an audio output function (sleep & music function) for receiving, at a time of a non-operative state, an analog audio signal which is output from a line output-equipped external device (e.g. a portable audio player 25), and outputting the audio signal from speakers 18 which are mounted on the housing of the computer 10.

When the output from the audio player 25 is directly connected to the speakers, since the output of the audio player 25 is small, compared to the capability of the speakers, the speakers are unable to output sound of a sufficient volume. According to the audio output function that is provided in the personal computer 10 in this embodiment, even when the personal computer 10 is in the non-operative state, power is supplied to a built-in amplifier for audio signal amplification, thus being able to amplify the audio signal from the audio player 25 and output the amplified audio signal from the speakers.

It is assumed that the "non-operative state" of the personal computer 10 includes states called "standby/sleep/suspend" (system state S3) and "hibernation" (hibernate state) (system state S4), as well as a power-off state (system state S5). In short, the non-operative state is a state in which the processor (CPU 30) does not operate. The power-on state is a system state S0.

The personal computer 10 in the embodiment executes, based on a request from a user, control to enable sound corresponding to an analog audio signal, which is output from the audio player 25, to be output from the speakers even in the non-operative state. The request from the user, which relates to the audio output function, is discriminated, for example, by the setting of enable/disable of the audio output function corresponding to the instruction from the user, or the detection of the state of various sensors and switches provided in the personal computer 10, which are switched by the user's operation. The details will be described later.

FIG. 1 is a perspective view showing the state in which a display unit of the personal computer 10 is opened. The personal computer 10 comprises a computer main body 11 and a display unit 12. A display device, which is composed of an LCD (Liquid Crystal Display) 17, is built in the display unit 12. The display screen of the LCD 17 is disposed at a substantially central part of the display unit 12.

The display unit 12 is attached to the computer main body 11 by hinge mechanisms 21 such that the display unit 12 is rotatable between an open position and a closed position, relative to the computer main body 11. The hinge mechanisms 21 include an LCD open/close sensor 55 (see FIG. 2) for detecting the state in which the display unit 12 is in the open state (i.e. the position where the display 12 is not put in close contact with the computer main body 11). The computer main body 11 has a thin box-shaped housing, to which a battery is detachably attached.

A keyboard 13, a power button switch 14 for power-on/power-off, general-purpose hardware buttons 15, a touch pad 16, and speakers 18 are disposed on the top surface of the computer main body 11.

Since the speakers 18 are disposed on the top surface of the computer main body 11, the front surfaces of the speakers 18 are covered if the display unit 12 is in the closed position. In other words, a sound with a normal volume/sound quality cannot be produced from the speakers 18. The LCD open/close sensor 55 detects, as the open position, the state in which the front surfaces of the speakers 18 are opened to such a degree that a sound with a sufficient volume/sound quality can be produced from the speakers 18, that is, the state in which the display unit 12 is opened to a predetermined degree or more.

A side surface of the computer main body 11 is provided with a line-in terminal 19 (jack) for receiving an analog audio signal which is output from the audio player 25, and a volume dial 20 which is used for volume control in the case where the audio output function is enabled at the time of the non-operative state. A cable 26, which is connected to a line-out terminal of the audio player 25, can be connected to the line-in terminal 19 by a plug 27.

Figure 2:
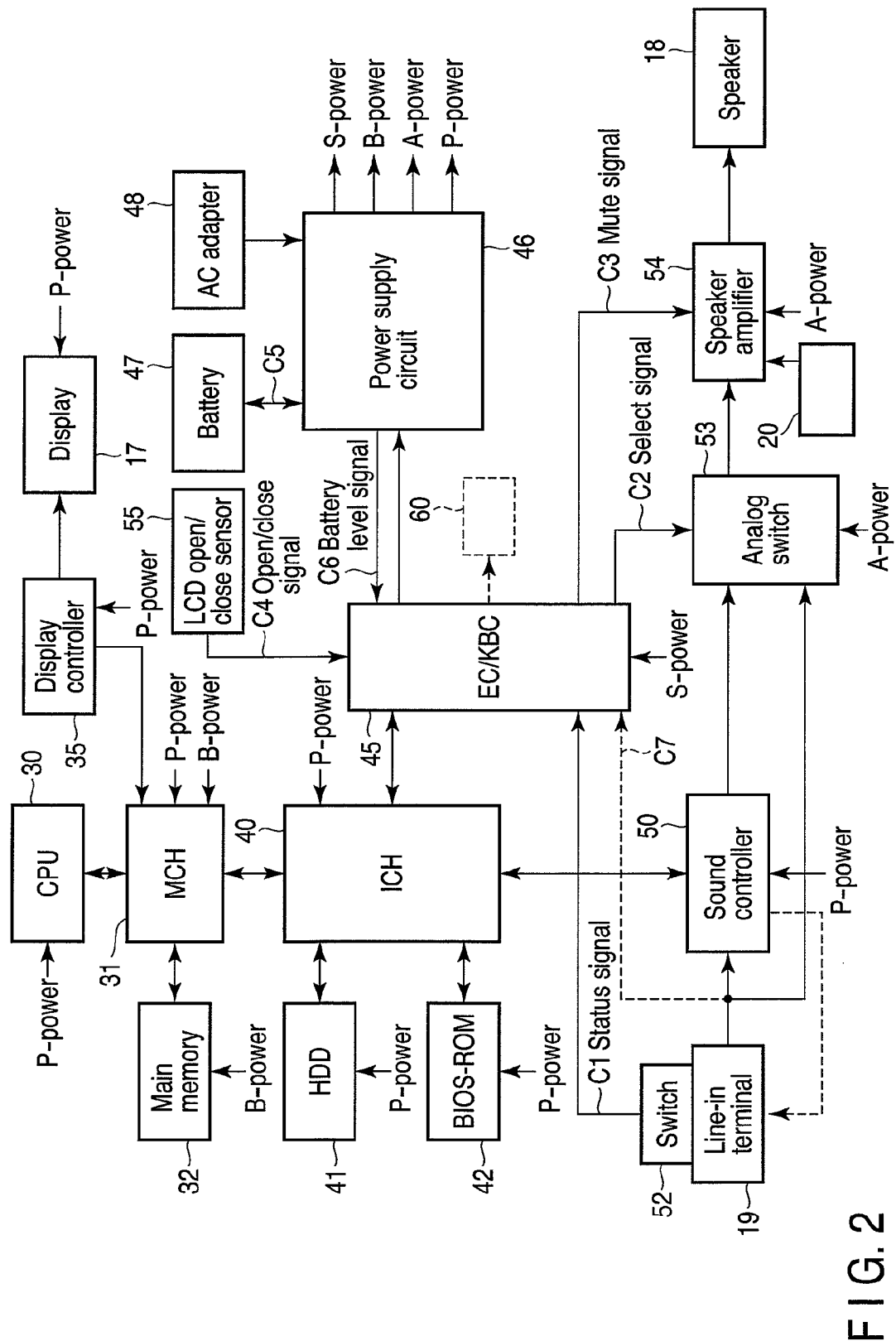
FIG. 2 is an exemplary block diagram showing the system configuration of a personal computer according to the embodiment.

Next, referring to FIG. 2, a description is given of the system configuration of the personal computer 10 according to the embodiment.

The personal computer 10, as shown in FIG. 2, includes a CPU 30, an MCH 31 (north bridge), a main memory 32, a display controller 35, an ICH 40 (south bridge), a hard disk drive (HDD) 41, a BIOS-ROM 42, an embedded controller/keyboard controller IC (EC/KBC) 45, and a power supply circuit 46.

The CPU 30 is a processor which is provided in order to control the operation of the personal computer 10, and executes an operating system (OS), drivers for controlling various hardware, and various application programs, which are loaded from the HDD 41 into the main memory 32. The CPU 30 also executes a system BIOS (Basic Input/Output System) which is stored in the BIOS-ROM 42. The system BIOS is a program for hardware control.

The MCH 31 is a bridge device which connects a local bus of the CPU 30 and the ICH 40. The MCH 31 incorporates a memory controller for access-controlling the main memory 32.

The display controller 35 controls the LCD 17 which is used as a display monitor of the personal computer 10. Based on an image-rendering request which is sent from the CPU 30 via the MCH 31, the display controller 35 executes a display process (graphics arithmetic process) for rendering frames in a video memory (VRAM).

The ICH 40 incorporates an IDE (Integrated Drive Electronics) controller and a Serial ATA controller for controlling the HDD 41 and an optical disc drive (not shown).

The embedded controller/keyboard controller IC (EC/KBC) 45 is a one-chip microcomputer in which an embedded controller for power management and a keyboard controller for controlling the keyboard (KB) 13, touch pad 15 and general-purpose hardware buttons 18 are integrated.

The EC/KBC 45 has a function of controlling the power supply circuit 46 in accordance with an operation of the power button switch 14 by a user, and powering on/off the personal computer 10. The power-on/off control of the personal computer 10 is executed by the cooperation between the EC/KBC 45 and power supply circuit 46. In addition, the EC/KBC 45 is a module which is supplied with power even when the personal computer 10 is in a non-operative state (power-off state), and is used as a controller for controlling the audio output function (sleep & music function) which is used when the personal computer 10 is in the non-operative state.

In order to control the audio output function, the EC/KBC 45 receives an open/close signal C4 from the LCD open/close sensor 55, which indicates whether the display unit 12 is in the closed position or not, and receives a battery level signal C6 from the power supply circuit 46, which indicates the residual capacity of the battery 47. The open/close signal C4 is, for example, a 1-bit signal. For example, if the open/close signal C4 is "1", the open/close signal C4 indicates that the display unit 12 is in the open position ("OPEN"). If the open/close signal C4 is "0", the open/close signal C4 indicates that the display unit 12 is in the closed position ("CLOSE"). When the open/close signal C4 is "0", that is, when the display unit 12 is in the closed position, the EC/KBC 45 executes control so as not to operate the audio output function.

The EC/KBC 45 controls the audio output function in accordance with the residual capacity of the battery 47, which is indicated by the battery level signal C6, and battery levels L1 and L2. It is assumed that the battery levels L1 and L2 are stored in the EC/KBC 45 in advance as preset values.

The battery level L2 is indicative of a level for determining the residual capacity of the battery 47, which enables restoration (re-activation) from the system state S3. In the present embodiment, the audio output function is used in the system state S3 (non-operative state). The audio output function is stopped before the residual battery capacity decreases to below the battery level L2, which enables restoration from the system state S3. If the residual battery capacity decreases to the battery level L2 or less when the audio output function is being executed, the EC/KBC 45 stops power supply to a speaker amplifier 54 and an analog switch 53. When the audio output function is not executed in the system state S3, if the residual battery capacity further decreases, an automatic transition to the system state S4 is executed by the function of the operating system which manages the system states.

The battery level L1 is indicative of a battery level for determining the residual battery capacity, at which no over-discharge occurs. In the battery 47, if a time passes in an over-discharged state, internal chemical substances are crystallized, and charging is hindered and the battery 47 is degraded. In order to prevent the degradation of the battery 47, a residual battery capacity of a predetermined level or more is necessary. If the residual battery capacity of the battery 47 decreases to the battery level L1 or less at the time of the system state S4 or S5, the EC/KBC 45 stops power supply to the speaker amplifier 54 and analog switch 53. Normally, the relationship between the battery level L1 and battery level L2 is L1<L2.

If a controller, which is operable in a power-off state, is provided in addition to the EC/KBC 45, the audio output function may be controlled by this controller.

The power supply circuit 46 receives power from a battery 47 which is attached to the computer main body 11 or from an external power supply which is connected via an AC adapter 48, and generates and supplies operation power to the respective components. The power supply circuit 46 is provided with a power supply microcomputer. The power supply microcomputer monitors the power supply (charge/discharge) relating to the respective components and the battery 47, and the charging state of the battery 47.

The power supply circuit 46 switches the power supply to the respective modules by the control of the EC/KBC 45, in accordance with the system state of the personal computer 10. By the control of the EC/KBC 45 according to the system state of the personal computer 10, the power supply circuit 46 can turn on/off the power supply of power supply systems of an S-power, a B-power, an A-power and a P-power.

The S-power is a power which is always supplied even in the state in which the system is powered off, and is supplied to the EC/KBC 45.

The B-power is a power which is supplied in a standby state in order to back up data which is recorded in the main memory 32.

The A-power is a power for enabling the audio output function when the personal computer 10 is in the non-operative state, and is supplied to the analog switch 53 and the speaker amplifier 54, which process an analog audio signal.

The P-power is a power which is supplied when the personal computer 10 is in the power-on state.

FIG. 3 shows powers which are supplied in the respective system states (S0, S3, S4 and S5) of the personal computer 10.

As shown in FIG. 3, when the personal computer 10 is in the power-on state (S0) (operative state), the power supply circuit 46 turns on power supply of all of the S-power, B-power, P-power and A-power.

When the personal computer 10 is in the standby state (S3) (or in the sleep/suspend state), the power supply of the S-power and B-power is turned on. Further, in the personal computer 10 of the embodiment, in order to use the audio output function in the standby state, when the plug 27 for connection to the cable 26 (audio player 25) is inserted in the line-in terminal 19 and the residual capacity of the battery 47 is the preset battery level L2 or more, the supply of the A-power is turned on, thereby supplying power to the analog switch 53 and speaker 54 which are operated for the audio output function.

When the personal computer 10 is in the power-off state (S5) or in the hibernation (hibernate state) (S4) in which backup for the main memory 32 is unnecessary, only the supply of the S-power is turned on. Further, in the personal computer 10 of the embodiment, in order to use the audio output function in the power-off state, when the plug 27 for connection to the cable 26 (audio player 25) is inserted in the line-in terminal 19 and the residual capacity of the battery 47 is the preset battery level L1 or more, the supply of the A-power is turned on, thereby supplying power to the analog switch 53 and speaker 54 which are operated for the audio output function.

Since the S-power is supplied to the EC/KBC 45, the power supply is turned on in any one of the system states and the control of the audio output function at the non-operation time is enabled.

When the AC adapter 48 is connected, since the power supply from the AC adapter 48 is greater than the power consumption of the battery 47, the audio output function can be operated regardless of the residual capacity of the battery 47. Thus, when the plug 27 is inserted in the line-in terminal 19, the A-power is supplied in any one of the system states.

FIG. 4 shows the presence/absence of supply of power to the respective modules in each of the system states.

In the system state S3, the working state immediately prior to the transition to the non-operative state is stored in the memory that is a volatile memory area, and the power supply to the modules, other than the memory, is stopped. If the power supply (B-power) to the memory is stopped in this state, the immediately preceding work data that is stored in the memory would be all lost.

In the system state S4, the working state immediately prior to the transition to the non-operative state is stored not in the memory but in the HDD 41 that is a nonvolatile memory area, and then the power supply to the respective modules is turned off. When power is turned on next time, the state of the work, which was done by the user immediately before, is restored based on the data stored in the HDD 41, and the work of starting a program, etc. can be omitted.

In the system state S5, all works are terminated, and the power supply to the respective modules is completely turned off.

In the meantime, in the system state S3, the working state immediately prior to the transition to the non-operative state may be stored in the memory that is the volatile memory area and at the same time in the HDD 41 that is the nonvolatile memory area, and then the power supply to the modules, other than the memory, may be turned off. When the state of the work, which was done by the user immediately before, is to be restored, the restoration of the data is basically performed from the memory. If the data stored in the memory is lost, the restoration of the data is performed from the HDD 41.

In the personal computer 10 in the embodiment, when the audio output function is performed in the system state S3, the audio output function is stopped if the residual battery capacity has decreased to below the battery level L2, thereby to secure the battery capacity for enabling re-activation from the system state S3.

The sound controller 50 (audio codec) converts digital audio data, which is input via the ICH 40, to an analog audio signal, and outputs the analog audio signal to the analog switch 53 by adjusting a volume or a sound quality (sound effect) by the control of the OS, device driver, audio playback program, etc. Similarly, when the personal computer 10 is in the operative state, the sound controller 50 executes volume control of an analog audio signal from the audio player 25, which is input via the line-in terminal 19, and outputs the resultant analog audio signal to the analog switch 53.

The analog switch 53 switches the path between the sound controller 50 side and the line-in terminal 19 side, in accordance with a select signal C2 from the EC/KBC 45. Under the control of the EC/KBC 45, the analog switch 53 is changed over to the sound controller 50 side when the personal computer 10 is in the operative state. When the audio output function is enabled at the non-operation time, the analog switch 53 is changed over to the line-in terminal 19 side, with the sound controller 50 being bypassed.

The speaker amplifier 54 amplifies the analog audio signal which is input via the analog switch 53, and outputs sound corresponding to the audio signal from the speakers 18. The speaker amplifier 54 can switch the mute/mute-release of sound in accordance with a mute signal C3 from the EC/KBC 45.

A switch 52 (or sensor) is incorporated in the line-in terminal 19. The ON/OFF of the switch 52 is changed by the insertion of the plug 27 for connection to the cable 26 in the line-in terminal 19, and the switch 52 outputs a status signal C1 corresponding to the ON/OFF state to the EC/KBC 45.

Next, the operation of the personal computer 10 in the embodiment is described.

Figure 5:
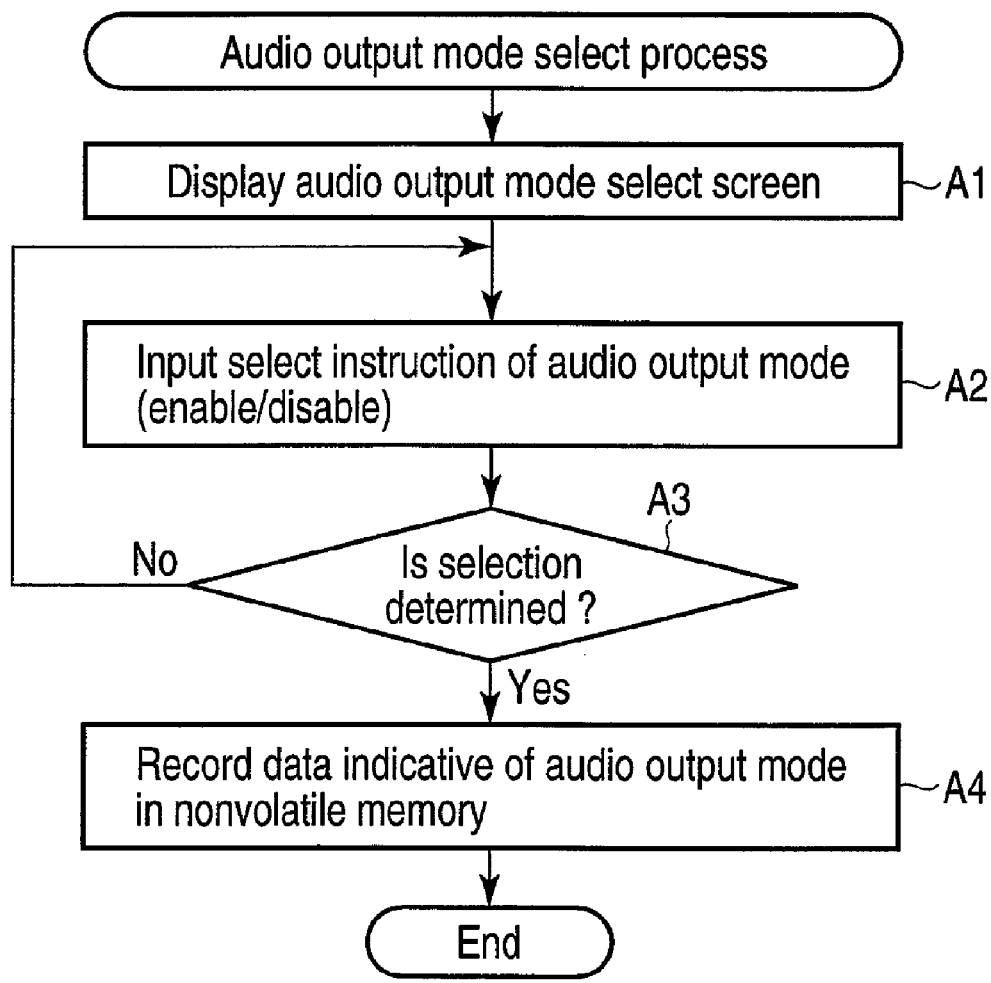
FIG. 5 is an exemplary flow chart illustrating an audio output mode select process in the embodiment.

FIG. 5 is a flow chart illustrating an audio output mode select process in the embodiment. The audio output mode select process is a process for selecting enable/disable of audio output by the audio output function, in accordance with the user's instruction, when the personal computer 10 is in the non-operative state.

The audio output mode select process in the embodiment can be executed, for example, in the process of BIOS setup or hardware setup. For example, the BIOS setup can be started and executed by performing a predetermined key operation at the time of powering on. The hardware setup can be executed by starting a utility program (or an application program) for hardware setup. In the present embodiment, the audio output mode select process may be executed by either of these methods.

If the execution of the audio output mode select process is instructed, the CPU 30 causes the LCD 17 to display an audio output mode select screen (block A1).

Figure 6:
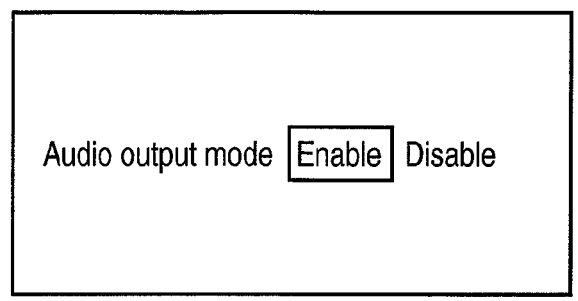
FIG. 6 is an exemplary view showing an audio output mode select screen in the embodiment.

FIG. 6 shows an example of the audio output mode select screen. On the audio output mode select screen, the audio output mode can be set at "Enable" or "Disable".

If an instruction to select "Enable" or "Disable" is input, for example, by the user's operation of the keyboard 13 (block A2), and if the determination of selection is instructed (Yes in block A3), the CPU 30 records the data indicative of the audio output mode, that is, the data indicative of "Enable" or "Disable", in the nonvolatile memory (block A4). The data indicative of the audio output mode, which is recorded in the nonvolatile memory, is commonly updated in either of the case where the audio output mode select process has been executed by the BIOS setup or the case where the audio mode select process has been executed by the hardware setup.

As the nonvolatile memory which records the data indicative of the audio output mode, use may be made of, as well as the BIOS-ROM 42, other recording media if recorded data can be read in a power-off process, which will be described later.

Figure 7:
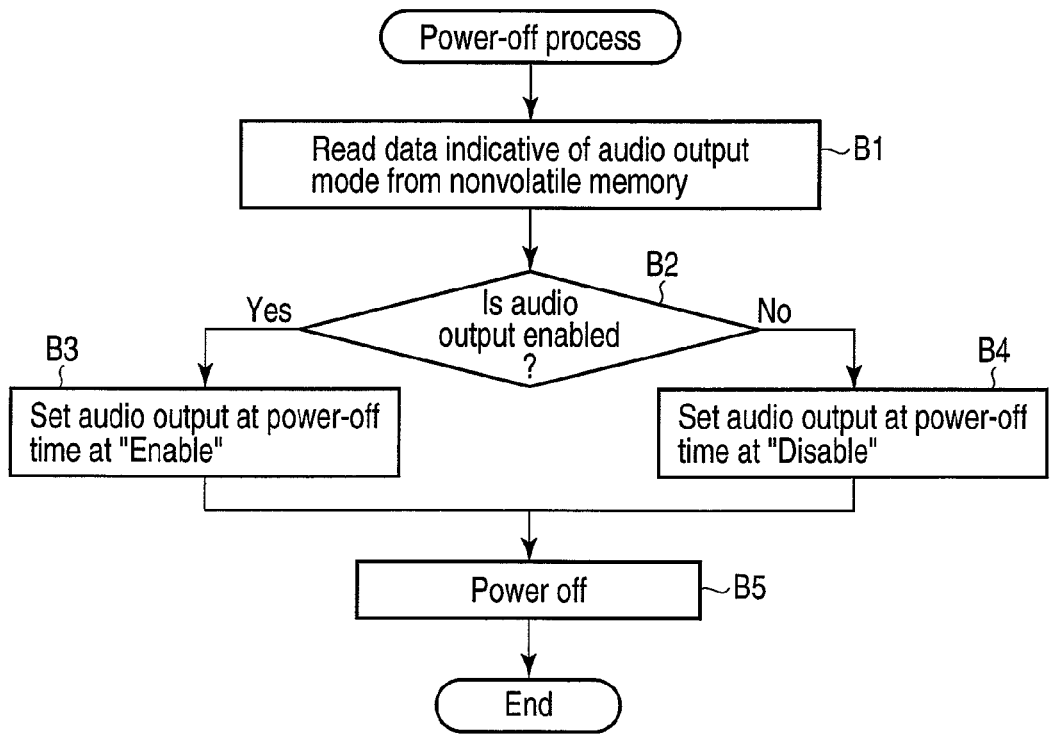
FIG. 7 is an exemplary flow chart illustrating a power-off process in the embodiment.

FIG. 7 is a flow chart illustrating the power-off process in the embodiment.

The CPU 30 starts the power-off process when power-off is requested in accordance with an instruction from the user or in accordance with a request from a program. The "power-off" refers to the setting of the personal computer 10 in the non-operative state, and "power-off" includes not only the complete power-off (S0), but also states called standby/sleep/suspend (S3) and hibernation (hibernate) (S4).

The CPU 30 reads from the nonvolatile memory (e.g. BIOS-ROM 42) the data indicative of the audio output mode by the audio output mode select process (block B1).

If the data indicative of the audio output mode is "Disable" of audio output (No in block B2), the CPU 30 sets the EC/KBC 45 to disable audio output at the non-operative time (block B4). Specifically, the CPU 30 copies the data indicative of "Disable" of the audio output mode in a predetermined flag register of the EC/KBC 45.

On the other hand, if the data indicative of the audio output mode is "Enable" of audio output (Yes in block B2), the CPU 30 sets the EC/KBC 45 to enable audio output at the non-operative time (block B3). Specifically, the CPU 30 copies the data indicative of "Enable" of the audio output mode in the predetermined flag register of the EC/KBC 45.

Then, the personal computer 10 is powered off (non-operative state) (block B5).

Figure 8:
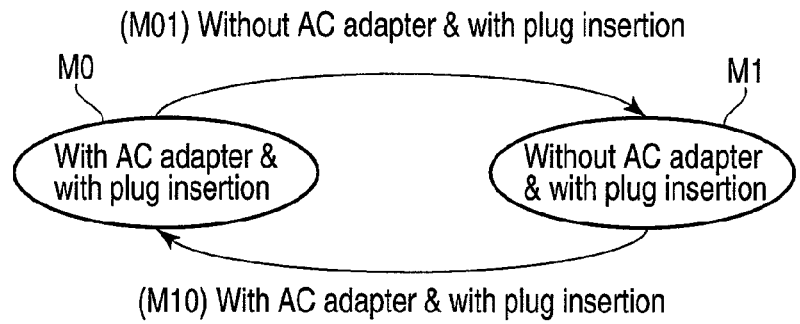
FIG. 8 is an exemplary state transition diagram illustrating a state transition according to the presence/absence of connection of an AC adapter 48 in the embodiment.
Figure 9:
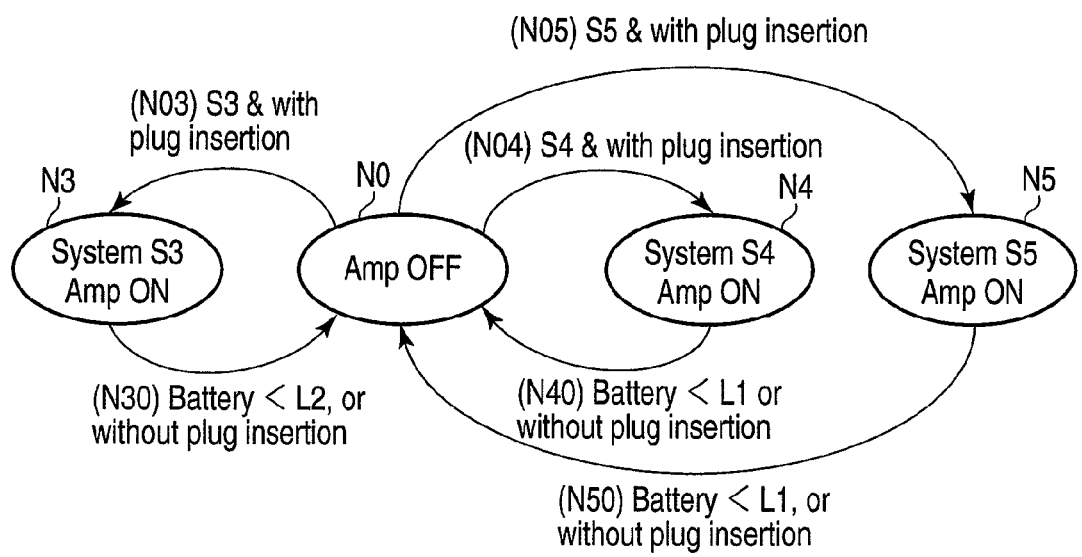
FIG. 9 is an exemplary state transition diagram illustrating a state transition according to the system states, the residual battery capacity and the presence/absence of insertion of a plug in a line-in terminal in the embodiment.

Next, referring to FIG. 8 and FIG. 9, a description is given of the state transition in the non-operative state of the personal computer 10 in the embodiment.

FIG. 8 is an exemplary state transition diagram illustrating a state transition according to the presence/absence of connection of the AC adapter 48.

If the audio output mode (audio output function) is set at "Enable" at the time of a transition to the non-operative state and if the AC adapter 48 is connected and power is supplied from the outside, the EC/KBC 45 operates the audio output function, regardless of the residual capacity of the battery 47 (state M0). Specifically, the EC/KBC 45 causes the power supply circuit 46 to turn on power supply (A-power) to the speaker amplifier 54 and analog switch 53. In the state M0 in which the AC adapter 48 is connected, if the plug 27 is connected to the line-in terminal 19, the output of audio by the audio output function is enabled in any one of the system states S3, S4 and S5.

If the AC adapter 48 is detached and power is supplied from the battery 47 (M01), a transition occurs to a state M1. From the state M1 in which the AC adapter 48 is detached and the plug 27 is connected to the line-in terminal 19, a further state transition occurs as shown in FIG. 9.

If the AC adapter 48 is connected in the state M1 (M10), a transition occurs to the state M0.

FIG. 9 is an exemplary state transition diagram illustrating a state transition according to the system states, the residual battery capacity and the presence/absence of insertion of the plug 27 in the line-in terminal 19.

The state (state N0) in which power supply to the speaker amplifier 54 is turned off includes three cases, namely, a case in which the audio output mode (audio output function) is set at "Disable", a case in which the plug 27 is not inserted in the line-in terminal 19, and a case in which the residual capacity of the battery is deficient. The case in which the residual capacity of the battery is deficient includes two states, namely, a state in which the audio output mode (audio output function) is set at "Enable" and the residual capacity of the battery 47 is lower than the battery level L1 in the system state S4 or S5, and a state in which the audio output mode (audio output function) is set at "Enable" and the residual capacity of the battery 47 is lower than the battery level L2 in the system state S3.

Specifically, if the residual capacity of the battery 47 has decreased to below the battery level L1 due to the use of the audio output function in the system state S4 or S5, the power supply (A-power) to the speaker amplifier 54 is turned off and the audio output function is stopped, thereby to prevent degradation of the battery 47. In addition, if the residual capacity of the battery 47 has decreased to below the battery level L2 due to the use of the audio output function in the system state S3, the power supply (A-power) to the speaker amplifier 54 is turned off and the audio output function is stopped, thereby to secure the battery capacity for enabling re-activation from the system state S3.

Next, the state (state N3) in which the power supply to the speaker amplifier 54 is turned on in the system state S3 is a state in which the audio output mode is set at "Enable", the system state is S3, the plug 27 is inserted in the line-in terminal 19, and the residual battery capacitance is the battery level 2 or more.

If the plug 27 is not inserted in the line-in terminal 19 in the state in which the audio output mode is set at "Enable" and the residual battery capacitance is the battery level 2 or more in the system state S3, the EC/KBC 45 turns off the power supply to the speaker amplifier 54 (state N0). In this case, if the EC/KBC 45 detects, by the status signal C1, that the plug 27 has been inserted in the line-in terminal 19 (N03), the EC/KBC 45 turns on the power supply to the speaker amplifier 54 (the transition to the state N3).

In the state N3, if the EC/KBC 45 detects, by the status signal C1, that the plug 27 has been detached from the line-in terminal 19 (N30), the EC/KBC 45 turns off the power supply to the speaker amplifier 54 (the transition to the state N0).

Next, the state (state N4) in which the power supply to the speaker amplifier 54 is turned on in the system state S4 is a state in which the audio output mode is set at "Enable", the system state is S4, the plug 27 is inserted in the line-in terminal 19, and the residual battery capacitance is the battery level 1 or more.

If the plug 27 is not inserted in the line-in terminal 19 in the state in which the audio output mode is set at "Enable" and the residual battery capacitance is the battery level 1 or more in the system state S4, the EC/KBC 45 turns off the power supply to the speaker amplifier 54 (state N0). In this case, if the EC/KBC 45 detects, by the status signal C1, that the plug 27 has been inserted in the line-in terminal 19 (N04), the EC/KBC 45 turns on the power supply to the speaker amplifier 54 (the transition to the state N4).

In the state N4, if the EC/KBC 45 detects, by the status signal C1, that the plug 27 has been detached from the line-in terminal 19 (N40), the EC/KBC 45 turns off the power supply to the speaker amplifier 54 (the transition to the state N0). Alternatively, in the state N4, if the EC/KBC 45 detects, by the battery level signal C6, that the residual capacity of the battery 47 is lower than the battery level L1 (N40), the EC/KBC 45 turns off the power supply to the speaker amplifier 54 (the transition to the state N0).

Next, the state (state N5) in which the power supply to the speaker amplifier 54 is turned on in the system state S5 is a state in which the audio output mode is set at "Enable", the system state is S5, the plug 27 is inserted in the line-in terminal 19, and the residual battery capacitance is the battery level 1 or more.

If the plug 27 is not inserted in the line-in terminal 19 in the state in which the audio output mode is set at "Enable" and the residual battery capacitance is the battery level 1 or more in the system state S5, the EC/KBC 45 turns off the power supply to the speaker amplifier 54 (state N0). In this case, if the EC/KBC 45 detects, by the status signal C1, that the plug 27 has been inserted in the line-in terminal 19 (N05), the EC/KBC 45 turns on the power supply to the speaker amplifier 54 (the transition to the state N5).

In the state N5, if the EC/KBC 45 detects, by the status signal C1, that the plug 27 has been detached from the line-in terminal 19 (N50), the EC/KBC 45 turns off the power supply to the speaker amplifier 54 (the transition to the state N0). Alternatively, in the state N5, if the EC/KBC 45 detects, by the battery level signal C6, that the residual capacity of the battery 47 is lower than the battery level L1 (N50), the EC/KBC 45 turns off the power supply to the speaker amplifier 54 (the transition to the state N0).

As has been described above, in the personal computer 10 in the embodiment, when the audio output mode is set at "Enable", the EC/KBC 45 determines the system state, the presence/absence of connection of the AC adapter 48 and the presence/absence of insertion of the plug 27. In accordance with the result of this determination, the EC/KBC 45 turns on/off the power supply (A-power) to the speaker amplifier 54 from the power supply circuit 46, thereby controlling the audio output function. Furthermore, in the embodiment, the battery levels L1 and L2 are preset in accordance with the system states, and the audio output function can be controlled in accordance with the residual capacity of the battery 47. Accordingly, when the audio output function is used in the system state S3, if the residual capacity of the battery 47 has decreased to below the battery level L2, the audio output function can be stopped, thereby to secure the battery capacity for enabling re-activation from the system state S3. Besides, when the audio output function is used in the system state S4 or S5, if the residual capacity of the battery 47 has decreased to below the battery level L1, the audio output function can be stopped, with the residual battery capacity remaining at such a level as to prevent degradation of the battery 47.

Figure 10:
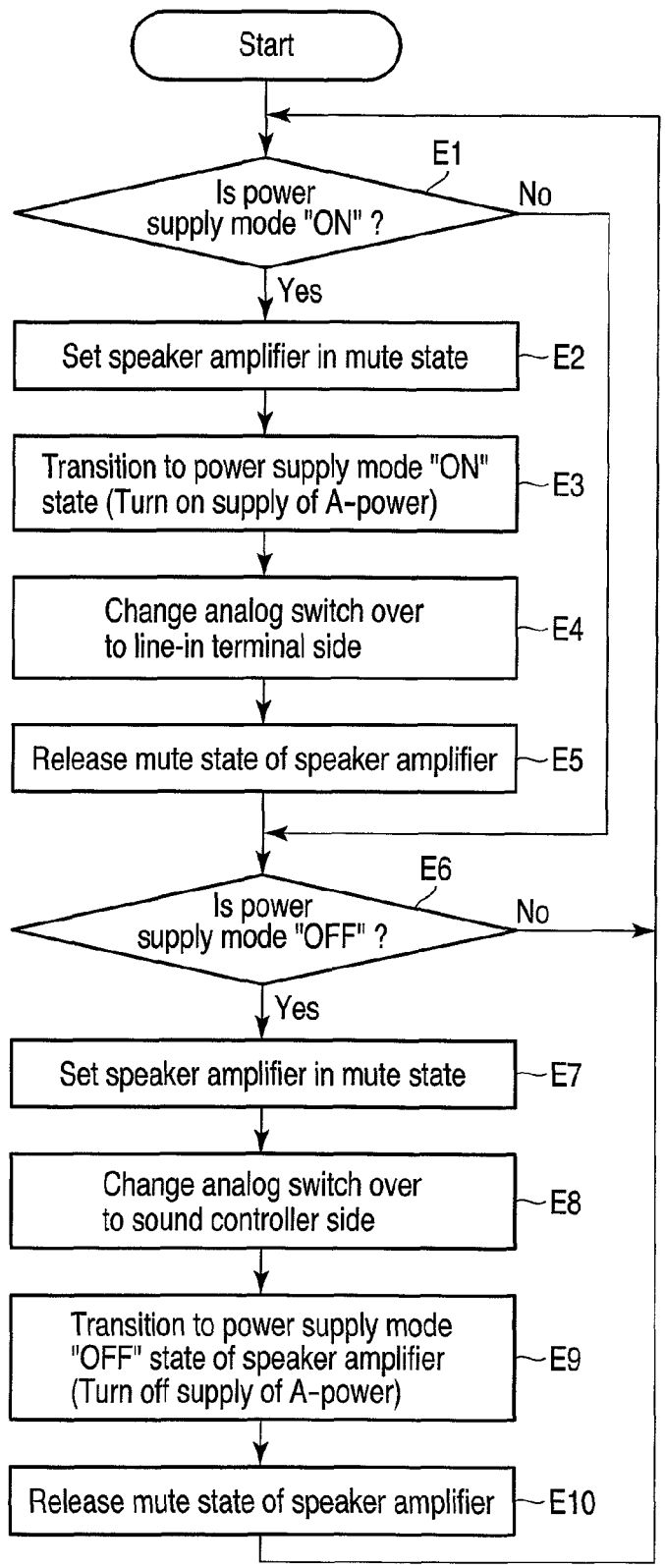
FIG. 10 is an exemplary flow chart illustrating ON/OFF control of power supply (A-power) to a speaker amplifier 54 in the embodiment.

Next, referring to a flow chart of FIG. 10, a description is given of the details of the ON/OFF control of the power supply (A-power) to the speaker amplifier 54 by the EC/KBC 45 in the non-operative state.

When the power supply mode (A-power) is to be turned on (Yes in block E1), the EC/KBC 45 sets the speaker amplifier 54 in the mute state by the mute signal C3 (block E2). Specifically, since noise occurs at the time of powering on the speaker amplifier 54 or at the time of changing over the analog switch 53, sound is prevented from being output from the speakers 18 by the speaker amplifier 54.

After the speaker amplifier 54 is set in the mute state, the EC/KBC 45 causes the power supply circuit 46 to turn on the supply of the A-power (block E3). Specifically, with the personal computer 10 being kept in the non-operative state, the A-power is supplied to only the speaker amplifier 54 and analog switch 53 which are associated with the audio output function.

Since the sound controller 50 is controlled by the program, the sound controller 50 does not operate in the system state S3, S4 or S5. Thus, the EC/KBC 45 controls the analog switch 53 by the select signal C2, thereby switching the path so that the analog audio signal that is input from the line-in terminal 19 may go to the speaker amplifier 54, with the sound controller 50 being bypassed (block E4).

After the change-over of the analog switch 53 is completed, the EC/KBC 45 releases the mute state of the speaker amplifier 54 by the mute signal C3 (block E5).

After the audio output function is enabled (the power supply mode is turned on), if music, for instance, is played back by the audio player 25 which is connected to the line-in terminal 19, the analog audio signal of the music is input to the speaker amplifier 54 via the line-in terminal 19. Since the speaker amplifier 54 is supplied with the A-power from the power supply circuit 46, the speaker amplifier 54 can amplify the analog audio signal and can output the music from the speakers 18. At this time, in the personal computer 10, the modules, which are not associated with the audio output function, are supplied with no power. Thus, the power consumption of the personal computer 10 can be made much lower than in the case where the personal computer 10 is in the power-on state.

When the power supply mode (A-power) is to be turned off (Yes in block E6), the EC/KBC 45 sets the speaker amplifier 54 in the mute state by the mute signal C3 (block E7).

After setting the speaker amplifier 54 in the mute state, the EC/KBC 45 controls the analog switch 53 by the select signal C2, thereby changing the analog switch 53 over to the sound controller 50 side and switching the path so that the analog audio signal that is input from the line-in terminal 19 may go to the speaker amplifier 54 via the sound controller 50 (block E8).

Thereafter, the EC/KBC 45 causes the power supply circuit 46 to turn off the supply of the A-power (block E9), and transitions the power supply mode to the OFF state.

Specifically, in the case of the power-off (S5) or hibernation (S4), only the S-power is supplied. In the case of the standby mode (S3), the supply of the B-power and S-power is turned on. In other words, the supply of the A-power to the analog switch 53 and speaker amplifier 54 is turned off.

After the switching of the power supply is completed, the EC/KBC 45 releases the mute state of the speaker amplifier 54 by the mute signal C3 (block E10).

In this manner, in the personal computer 10 of this embodiment, when the audio output function is turned on/off in the non-operative state (system state S3, S4 or S5) such as the power-off state or the standby mode, the ON/OFF of the power supply (A-power) to the speaker amplifier 54 is controlled and the change-over of the analog switch 53 is controlled.

In the above description, the battery levels L2 and L2 are preset in the EC/KBC 45. Alternatively, the battery levels L1 and L2 may be changed by an instruction from the user. The reason is that in usual cases batteries of the same kind have individual variances and thus, when different batteries 47 are used, even if the battery level L1, for instance, is commonly set at "residual battery capacity: 5%", it is possible that the time until reaching the battery level L1 may differ. In addition, even the same battery 47 has the capability that differs between the time immediately after the purchase thereof and the time after the use of several years, and similarly the time until reaching the battery level L1, L2 may differ. For example, when the capability of the battery 47 is excellent, the battery level L1 may be set at "residual battery capacity: 3%" which is lower than the default "residual battery capacity: 5%". Thereby, the audio output function can be used for a longer time, with no degradation occurring in the battery 47. In this manner, by the instruction from the user, the battery level L1, L2 can be varied, and the needs of the user who uses the audio output function can be satisfied more finely.

Not only the battery levels L1 and L2 may be set by the user, but also the content of control may be set according to the state of the battery 47 which is determined based on the battery level L1, L2.

The above-described settings of the battery level and control content can be executed in the process of the BIOS setup or hardware setup, for example, like the audio output mode select process.

There may be provided an output module which can inform the user of the residual capacity of the battery 47 while audio is being output by the audio output function at the non-operation time. For example, an LED (Light Emitting Diode) 60 is mounted as the output module. The EC/KBC 45 varies the color of the LED and the speed of flickering in accordance with the residual capacity of the battery 47, which is indicated by the battery level signal C6 from the power supply circuit 46. The EC/KBC 45 can operate even when the personal computer 10 is in the non-operative state. Accordingly, even when the personal computer 10 is not activated (i.e. not powered on), an approximate time, for which the audio output function can be used, can be reported to the user. In the meantime, an output module, other than the LED, may be mounted.

In the above description, the switch 52 detects that the plug 27 has been inserted in the line-in terminal 19 (jack). Alternatively, the insertion of the plug 27 may be detected based on the volume level of the audio signal C7 that is input from the line-in terminal 19. Specifically, the same control as in the case of detecting the insertion of the plug 27 is executed by detecting that music, for instance, is played back by the audio player 25 and audio (music), which is to be output from the speakers 18, is present. Thereby, when the plug 27 is merely inserted in the line-in terminal 19 and there is no sound that is to be output from the speakers 18, no unnecessary power (A-power) is supplied to the speaker amplifier 54 and analog switch 53 and, therefore, power-saving can be achieved.

In the above description, the line-in terminal 19 has been described as the terminal for audio signal input, but the line-in terminal 19 may be used also as the terminal for microphone connection. In this case, the power for a microphone is supplied to the line-in terminal 19 via the sound controller 50. Since the supply of the P-power to the sound controller 50 is turned off in the power-off state or in the standby mode, the power for the microphone is not supplied to the line-in terminal 19.

The switch 52, which is built in the line-in terminal 19, may be replaced with an independent switch which enables ON/OFF switching by the user's manual operation. The status signal C1 corresponding to the ON/OFF of this switch is input to the EC/KBC 45. In the case of using the portable audio player 25 by connecting it to the personal computer 10, the user can request that the audio output function be enabled, by turning on this switch.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a speaker;
a terminal configured to receive an audio signal from an external device;
an amplifier configured to amplify the audio signal received from the terminal, and to output the amplified audio signal to the speaker;
a battery;
a power supply circuit configured to supply power from the battery to the amplifier when no external power is supplied;
a switch configured to switch between a first path by which a sound controller operating when the electronic apparatus is in an operative state is connected to the amplifier and a second path by which the terminal and the amplifier are connected to each other without passing through the sound controller; and
a controller configured to change the switch over to the second path when the electronic apparatus is in a first non-operative state or a second non-operative state, to control power supply from the power supply circuit to the amplifier based on residual capacity of the battery and a preset first battery level, when the electronic apparatus is in the first non-operative state, and to control the power supply from the power supply circuit to the amplifier, based on the residual capacity of the battery and a preset second battery level different from the preset first battery level, when the electronic apparatus is in the second non-operative state.

2. The electronic apparatus of claim 1, wherein the controller is configured to stop the power supply to the amplifier when the residual capacity of the battery decreases to below the first preset battery level in the first non-operative state, and to stop the power supply to the amplifier when the residual capacity of the battery decreases to below the second preset battery level in the second non-operative state.

3. The electronic apparatus of claim 1, further comprising a setting module configured to set data indicating whether audio output from the speaker is to be enabled or disabled when the electronic apparatus is in the non-operative state,
wherein the controller is configured to control the power supply circuit in order to supply the power to the amplifier, based on the residual capacity of the battery, the first and second battery levels, and the data.

4. The electronic apparatus of claim 1, further comprising a battery level changing module configured to change the first and second battery levels.

5. The electronic apparatus of claim 1, further comprising an output module configured to notify the residual capacity of the battery.

6. The electronic apparatus of claim 1, further comprising a detection module configured to detect a connection of the external device to the terminal,
wherein the controller is configured to control the power supply circuit in order to stop the supply of power to the amplifier when the external device is not connected to the terminal.

7. The electronic apparatus of claim 1, wherein the electronic apparatus is a notebook computer comprising:
a display unit; and
a main body comprising the speaker and a detector configured to detect whether the display unit is opened or closed more than to a predetermined angle.

8. A method of amplifying an audio signal when an electronic apparatus is in a non-operative state, comprising:
connecting a plug connected to an external device to a terminal of the electronic apparatus in a first non-operative state and a second non-operative state, wherein the terminal is configured to receive an audio signal from the external device,
determining whether a residual capacity of a battery is greater than a preset battery level or whether the electronic apparatus is connected to an external power source,
switching between a first path by which a sound controller operating when the electronic apparatus is in an operative state is connected to an amplifier and a second path by which the terminal and the amplifier are connected to each other without passing through the sound controller;
supplying power to an amplifier when the residual capacity of the battery is greater than a first battery level in the first non-operative state or when the electronic apparatus is connected to the external power source;
supplying power to the amplifier when the residual capacity of the battery is greater than a second battery level different from the first battery level in the second non-operative state or when the electronic apparatus is connected to the external power source; and
amplifying the audio signal received from the terminal by use of the amplifier and outputting the amplified audio signal to the speaker.

9. The method of claim 8 further comprising supplying power to an analog switch and the speaker.

10. The method of claim 8, further comprising:
stopping the power supply to the amplifier when the residual capacity of the battery decreases to below the first battery level in the first non-operative state, and stopping the power supply to the amplifier when the residual capacity of the battery decreases to below the second preset battery level in the second non-operative state.

11. The method of claim 8, wherein determining whether the residual capacity of the battery is greater than the first and second battery levels comprises a controller receiving a battery level signal from a power supply circuit.

12. The method of claim 8, further comprising receiving an open/close signal from a display panel open/close sensor.